United States Patent Office 2,874,190  
Patented Feb. 17, 1959

2,874,190
α-MERCAPTO-AMIDE DERIVATIVES

Moses Wolf Goldberg, Upper Montclair, and Hanns Hanina Lehr, Montclair, N. J., assignors to Hoffmann-La Roche Inc., Nutley, N. J., a corporation of New Jersey No Drawing. Application February 7, 1957  
Serial No. 638,691

9 Claims. (Cl. 260—561)

This invention relates to α-mercapto-amide derivatives. More particularly, the invention relates to amides which are represented by the following structural formula

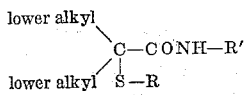

wherein R represents lower alkenyl or lower alkynyl and R' represents hydrogen, lower alkyl or lower alkenyl.

The lower alkyl, lower alkenyl and lower alkynyl groups, respectively, in the above formula include for example methyl, ethyl, propyl, butyl, isobutyl, allyl, crotyl, pentenyl, propargyl, butynyl, etc. A preferred group constitutes compounds having the above structural formula wherein R' represents hydrogen and R represents lower alkenyl or propargyl. Most preferred are those compounds having the structural formula set out above wherein R' represents hydrogen, R represents the allyl or propargyl radical and the lower alkyl groups on the α-carbon atom are either methyl or ethyl.

The compounds of this invention are synthesized by alkylating α-mercapto-dialkyl acetic acid on the sulfur atom, e. g. with an alkenyl halide or an alkynyl halide. The α-alkenyl- or α-alkynyl mercapto-dialkyl acetic acid thus obtained is converted to the acid halide, for example by treatment with thionyl chloride. The acid halide is then reacted with ammonia or a primary amine to obtain, respectively, the corresponding unsubstituted or substituted amide. Alternatively an α-bromo-dilower alkyl amide may be reacted with the appropriate mercaptan, e. g. allyl mercaptan.

The compounds of this invention are sedatives and muscle relaxants and are useful as tranquillizing agents. The compounds may be administered orally by combining therapeutic doses with carriers and/or conventional excipients to prepare tablets, syrups, elixirs, etc., according to accepted pharmaceutical practice.

The following examples are illustrative of the invention. All temperatures are in degrees centigrade.

Example 1

97.5 g. of α-mercaptodiethylacetic acid, dissolved in 1000 cc. of ethanol, was added to a cooled solution of 30.1 g. of sodium in 900 cc. of ethanol. 84 g. of allyl bromide was then added gradually, and the mixture was stirred for 16 hours at room temperature. After filtration, the solution was evaporated to dryness and the residue was dissolved in water. The solution was acidified and extracted with ether. The ether extract was dried over sodium sulfate and then fractionated in vacuo to obtain α-allylmercaptodiethylacetic acid as a colorless oil, boiling at 118–122°/0.3 mm. 102 g. of the acid were refluxed for 3 hours with 150 cc. of thionyl chloride to obtain α-allylmercaptodiethylacetyl chloride boiling at 121–125°/16 mm.

97 g. of the acid chloride was dissolved in 500 cc. of ether and the solution was added gradually to a chilled solution of 32 g. of ammonia in 500 cc. of ether. After standing for 5 hours at room temperature, water was added, the organic layer was separated and dried over sodium sulfate. Removal of the solvent yielded a liquid residue, which solidified slowly in the cold. Recrystallization from pentane yielded white crystals of α-allylmercapto-α,α-diethylacetamide, M. P. 39–41°.

5 g. of α-allylmercapto-α,α-diethylacetyl chloride was added to 50 cc. of concentrated aqueous ammonia and stirred under cooling for 6 hours, while ammonia gas was passed through the mixture. After standing overnight in the refrigerator, the mixture was extracted with ether and the ether extract dried over sodium sulfate. Removal of the solvent yielded an oil, which crystallized on seeding. Recrystallization from pentane yielded α-allylmercapto-α,α-diethylacetamide, M. P. 39–40°.

Example 2

16 g. of α-allylmercapto-diethylacetyl chloride, dissolved in 100 cc. of ether, was added gradually to a chilled solution of 10 g. of methylamine in 100 cc. of ether. After standing for 5 hours at room temperature, water was added, the organic layer was separated and dried over sodium sulfate. The residue, obtained after removal of the ether, recrystallized from pentane, was N - methyl - α - allylmercapto - diethylacetamide, M. P. 46–48°.

Example 3

15 g. of α-allylmercapto-diethylacetyl chloride, dissolved in 100 cc. of ether, was added gradually to a solution of 8.5 g. of allylamine in 100 cc. of ether. After standing overnight at room temperature, water was added, the organic layer was separated and dried over sodium sulfate. After removal of the ether, the residue was fractionated in vacuo to obtain N-allyl-α-allylmercaptodiethylacetamide, boiling at 132–134°/1.5 mm. It solidifies in the refrigerator, but is liquid at room temperature.

Example 4

35 g. of α-mercapto-diethylacetic acid was added to a cooled solution of 10.8 g. of sodium in 350 cc. of ethanol. 32.6 g. of crotyl bromide was added to the solution and the mixture was stirred at room temperature for 18 hours. After refluxing for 1 hour, the solvent was removed in vacuo and the residue was dissolved in water. The solution was acidified and extracted with ether. The ether extract was dried over sodium sulfate, and then evaporated to dryness in vacuo. The residue was fractionated in vacuo, yielding α-crotylmercaptodiethylacetic acid, boiling at 126–130°/0.3 mm.

28 g. of this acid was refluxed for 2 hours with 40 cc. of thionyl chloride. Fractionation in vacuo yielded α-crotylmercaptodiethylacetyl chloride, boiling at 127–130°/15 mm.

14.5 g. of the acid chloride, dissolved in 100 cc. of ether, was added gradually to a chilled solution of 5 g. of ammonia in 100 cc. of ether. After standing overnight at room temperature, water was added, the organic layer separated and dried over sodium sulfate. The filtered ether solution was evaporated to dryness and the solid α-crotylmercapto-α,α-diethylacetamide was recrystallized from petroleum ether, M. P. 66–68°.

Example 5

14.5 g. of α-crotylmercapto-diethylacetyl chloride, dissolved in 100 cc. of ether, was added gradually to a chilled solution of 8 g. of methylamine in 100 cc. of ether. After standing overnight at room temperature, water was added, the organic layer was separated and dried over sodium sulfate. The filtered ether solution was evaporated to dryness and the residue was fractionated in vacuo to obtain N-methyl-α-crotylmercapto- α,α-diethylacetamide, boiling at 129–132°/1 mm. It solidified after standing in the refrigerator for about 3 weeks.

Example 6

148 g. of α-mercapto-α,α-diethylacetic acid was added to a chilled solution of 46 g. of sodium in 1500 cc. of ethanol. 125 g. of propargyl bromide, dissolved in 150 cc. of ethanol, was then added gradually. The mixture was stirred for 18 hours at room temperature. The ethanol was removed in vacuo and the residue was dissolved in water. The solution was acidified and extracted with ether. The ether extract was dried over sodium sulfate and then evaporated to dryness. The residue was fractionated in vacuo to obtain α-propargylmercapto-diethylacetic acid, boiling at 124–130°/0.3 mm.

136 g. of α-propargylmercapto-diethylacetic acid was refluxed with 200 cc. of thionyl chloride for 4 hours. After removal of the excess thionyl chloride, the residue was fractionated in vacuo, yielding α-propargylmercapto-diethylacetyl chloride, boiling at 98–101°/13 mm.

136 g. of α-propargylmercapto-diethylacetyl chloride, dissolved in 800 cc. of ether, was added to a chilled solution of 48 g. of ammonia in 1000 cc. of ether. After standing for 6 hours at room temperature, water was added, the organic layer was separated and dried over sodium sulfate. The filtered ether solution was evaporated to dryness and the α-propargylmercapto-α,α-diethylacetamide thus obtained was recrystallized from benzene-petroleum ether, M. P. 80–81°.

Example 7

10 g. of α-propargylmercapto-diethylacetyl chloride, dissolved in 100 cc. of ether, was added gradually to a chilled solution of 6 g. of methylamine in 100 cc. of ether. After 6 hours, water was added, the organic layer was separated and dried over sodium sulfate. Removal of the solvent yielded a solid residue which was recrystallized from ligroin (60–90°). The white crystals of the N-methyl-α-propargylmercapto-α,α-diethylacetamide melt at 69–71°.

Example 8

136 g. of α-mercapto-isobutyric acid was added to a cooled solution of 52.2 g. of sodium in 1500 cc. of ethanol. 143.5 g. of allyl bromide, dissolved in 100 cc. of ethanol, was then added gradually and the mixture was stirred for 18 hours at room temperature under nitrogen. After removal of the solvent in vacuo, the residue was dissolved in water, the solution was acidified and extracted with ether. The ether extract was dried over sodium sulfate. After removal of the ether, the residue was fractionated in vacuo, yielding α-allylmercapto-isobutyric acid, boiling at 141–145°/18 mm. The acid (156 g.) was converted to its acid chloride by refluxing for 2½ hours with 250 cc. of thionyl chloride. Fractionation in vacuo yielded α-allylmercapto-isobutyryl chloride, boiling at 91–94°/15 mm.

149 g. of the acid chloride, dissolved in 800 cc. of ether was added slowly to a chilled solution of 53 g. of ammonia in 1000 cc. of ether. After standing overnight at room temperature, the ether was removed and the α-allylmercapto-isobutyramide was recrystallized from ligroin (60–90°), M. P. 75–76°.

Example 9

14.5 g. of α-allylmercapto-isobutyryl chloride, dissolved in 100 cc. of ether, was added gradually to a chilled solution of 10 g. of methylamine in 100 cc. of ether. After 6 hours, water was added, the organic layer was separated and dried over sodium sulfate. After removal of the ether, the N-methyl-α-allylmercapto-isobutyramide was recrystallized from petroleum ether, M. P. 59–60°.

Example 10

60 g. of α-mercapto-isobutyric acid was added to a chilled solution of 23 g. of sodium in 1000 cc. of ethanol. To this solution was added 70 g. of crotyl bromide and the mixture stirred for 16 hours under nitrogen.

After removal of the solvent in vacuo, the residue was dissolved in water, and the acidified solution was extracted with ether. The ether extract was dried over sodium sulfate. The residue obtained after removal of the ether, was fractionated in vacuo, yielding α-crotylmercapto-isobutyric acid, boiling at 105–108°/0.2 mm.

The acid chloride was obtained by refluxing the acid (72 g.) with 100 cc. of thionyl chloride for 2½ hours. Fractionation in vacuo yielded α-crotylmercapto-isobutyryl chloride, boiling at 99–102°/15 mm.

36 g. of the acid chloride, dissolved in 200 cc. of ether, was added gradually to a chilled solution of 13 g. of ammonia in 200 cc. of ether. After 5 hours, water was added, the organic layer was separated and dried over sodium sulfate. Removal of the solvent yielded a solid residue, which was recrystallized from benzene-petroleum ether. The α-crotylmercapto-isobutyramide melts at 91–93°.

Example 11

36 g. of α-crotylmercapto-isobutyryl chloride, dissolved in 150 cc. of ether, was added to a chilled solution of 23 g. of methylamine in 500 cc. of ether. After 5 hours, water was added, the organic layer was separated and dried over sodium sulfate. The liquid residue, obtained after removal of the solvent, was fractionated in vacuo, yielding N-methyl-α-crotylmercapto-isobutyramide, boiling at 102–105°/0.5 mm. and solidifying in the refrigerator. After recrystallization from pentane, the M. P. was 42–43°.

Example 12

120 g. of α-mercapto-isobutyric acid was added to a cooled solution of 46 g. of sodium in 1500 cc. of ethanol. 125 g. of propargyl bromide, dissolved in 150 cc. of ethanol, was then added gradually and the mixture was stirred for 18 hours at room temperature under nitrogen. The ethanol was removed in vacuo, the residue was dissolved in water and the acidified solution was extracted with ether. The extract was dried over sodium sulfate. After removal of the ether, the residue was fractionated in vacuo, yielding α-propargylmercapto-isobutyric acid, boiling at 98–103°/0.2 mm. and solidifying in the cold. The acid could be crystallized from pentane, M. P. 37–38°. To obtain the acid chloride, 138 g. of acid were refluxed for 4 hours with 200 cc. of thionyl chloride. Fractionation in vacuo yielded α-propargylmercapto-isobutyryl chloride, boiling at 98–101°/13 mm.

115 g. of the acid chloride, dissolved in 600 cc. of ether, was added slowly to a chilled solution of 44 g. of ammonia in 1000 cc. of ether. After standing overnight at room temperature, water was added. The organic layer was separated and dried over sodium sulfate. The α-propargylmercapto-isobutyramide, obtained after removal of the ether, was recrystallized from benzene-petroleum ether, M. P. 75–76°.

Example 13

18 g. of α-propargylmercapto-isobutyryl chloride, dissolved in 100 cc. of ether, was added gradually to a chilled solution of 12.5 g. of methylamine in 200 cc. of ether. After 5 hours, water was added, the organic layer was separated and dried over sodium sulfate. After removal of the ether, the residue was recrystallized from ligroin (60–90°). The N-methyl-α-propargylmercapto-isobutyramide melts at 64–66°.

We claim:

1. A compound selected from the group consisting of the amides represented by the formula

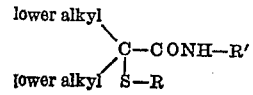

wherein R represents a member of the group consisting of lower alkenyl and lower alkynyl and R' represents a member of the group consisting of hydrogen, lower alkyl and lower alkenyl.

2. A compound represented by the formula

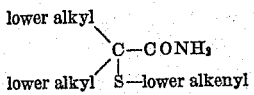

3. A compound represented by the formula

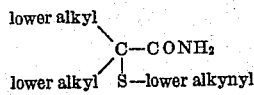

4. A compound represented by the formula

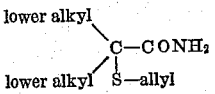

5. A compound represented by the formula

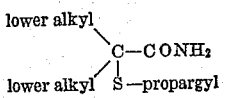

6. α-Allylmercapto-α,α-diethylacetamide.
7. α-Propargylmercapto-α,α-diethylacetamide.
8. α-Allylmercapto-isobutyramide.
9. α-Propargylmercapto-isobutyramide.

No references cited.